July 14, 1925.
K. L. HANSEN ET AL
1,546,068
PROCESS OF WELDING ROTOR BARS
Filed Jan. 2, 1925
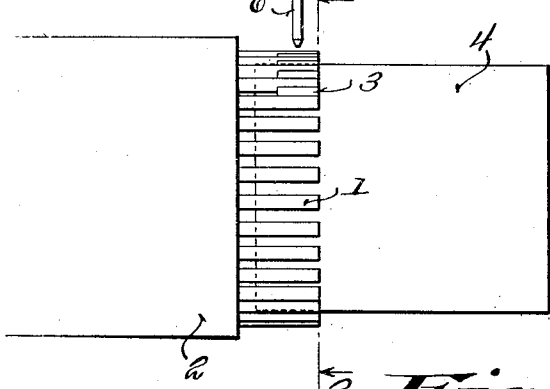
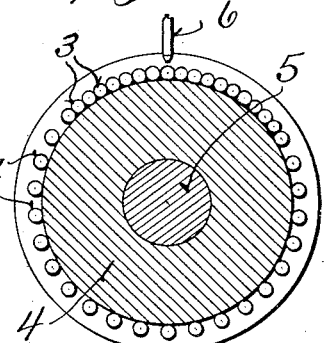
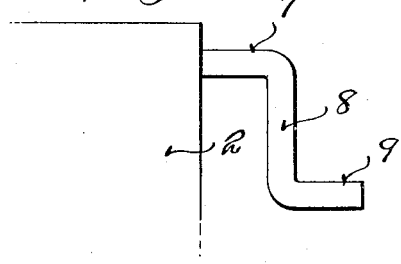
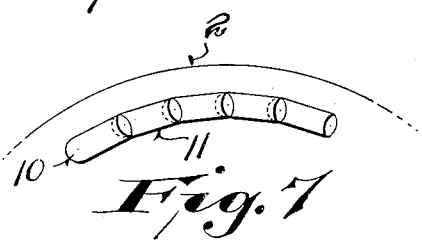
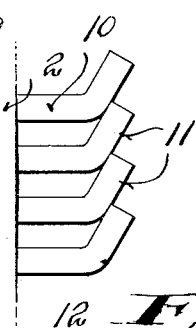
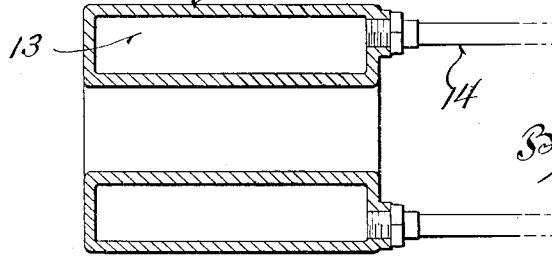
Inventors:
Klaus L. Hansen
William G. Oesterlein
By Young & Young
Attorneys Patented July 14, 1925.

1,546,068

UNITED STATES PATENT OFFICE.

KLAUS L. HANSEN AND WILLIAM J. OESTERLEIN, OF MILWAUKEE, WISCONSIN, ASSIGNORS TO NORTHWESTERN MFG. CO., OF MILWAUKEE, WISCONSIN.

PROCESS OF WELDING ROTOR BARS.

Application filed January 2, 1925. Serial No. 199.

*To all whom it may concern:*

Be it known that we, KLAUS L. HANSEN and WILLIAM J. OESTERLEIN, both citizens of the United States, and residents of Milwaukee, in the county of Milwaukee and State of Wisconsin, have invented certain new and useful Improvements in Processes of Welding Rotor Bars; and we do hereby declare that the following is a full, clear, and exact description thereof.

This invention relates to a method of welding copper or similar bars and is particularly directed to a process of welding rotor bars.

The usual method of constructing end rings for squirrel cage rotors by punching them out of sheet copper necessarily involves considerable waste of material, and these end rings have to be subsequently brazed or soldered to the rotor bars with a spelter or solder having a high melting point. Further, the spelter or solder, such as silver solder, is expensive. Considerable effort has been directed towards the elimination of this type of end ring construction.

Various attempts have been made to weld the ends of the rotor bars but these attempts have not proven wholly satisfactory. The end rings have been cast upon the projecting ends of the rotor bars, but the physical characteristics of this cast material, especially, its electrical resistance has been found to vary considerably. A further method closely related to the cast ring method has been to melt the projecting ends of the rotor bars and control the flow of liquefied material by means of a mold or similar member. An example of this process is disclosed in U. S. Patent No. 1,160,428 of Nov. 16, 1915, issued to G. E. Markley. The use of a mold accurately fitting the ends of the rotor bars is expensive and is difficult in actual practice. Further, the physical characteristics of the cast ring as noted above, vary considerably and cannot be wholly relied upon.

This invention is designed to overcome the above noted defects and objects of such invention are to provide a method of welding rotor bars which will retain the major portion of the original physical characteristics of such bars and which does not require the use of a mold and does not produce a liquefaction of the ends of the rotor bars, thus retaining the original characteristics of the usual drawn copper bars.

Further objects are to provide a process which forms a mechanically strong joint with as high a melting point as the bars themselves.

Further objects are to provide a method in which the heat may be concentrated upon a small area and flowing of the metal prevented and the major portion of the welded ends retained in their initial state.

Further objects are to provide a method of welding rotor bars in which a portion of the ends are rendered just sufficiently plastic to permit their union by the action of molecular forces of adhesion and cohesion while a large portion of such ends remain in their initial physical condition and are unchanged by this process.

Embodiments of the invention are shown in the accompanying drawing, in which:—

Figure 1 is a diagrammatic view showing the parts in position in one stage of the process.

Figure 2 is a sectional view on the line 2—2 of Figure 1.

Figure 3 is a fragmentary sectional view through a finished portion of the resulting end ring.

Figure 4 is a fragmentary view of a further manner of forming the rotor bars prior to welding.

Figure 5 is a corresponding end view of the structure shown in Figure 4.

Figure 6 is a view of one end of a rotor showing a still further method of forming the rotor bars.

Figure 7 is an end view of the structure shown in Figure 6.

Figure 8 is a transverse sectional view of a modified form of cooling block.

In practising this invention, the rotor bars 1 are left projecting from the rotor 2, as shown in Figure 1 and any suitable means, such as small cylindrical copper bars 3, may be interposed between adjacent rotor bar ends. A cooling block 4 of annular formation and relatively massive is provided with a central aperture and is slipped over the shaft 5 of the rotor, as shown diagrammatically in Figures 1 and 2, although other means may be employed for holding this cooling block in place. In practice it has been further efficacious to construct the block 4 of cast iron. The block is slipped in place, as shown in Figure 1, with its inner end positioned beneath and in contact with the rotor bar ends. Thereafter, an arc is struck between the electrode 6 and one of the rotor bar ends. As shown in Figures 1 and 2 the arc is preferably positioned directly over the axis of the rotor and it has been found convenient to use the ordinary carbon electrode. The rotor is slowly rotated until the arc has traveled completely around the ends of the projecting rotor bars 1. It is to be noted that the rotor bar ends are not liquefied in this process. They are rendered sufficiently plastic adjacent their upper halves so that they unite primarily under the action of the molecular forces of adhesion and cohesion. The rotor bars are kept chilled by the cooling block 4 and from an inspection of Figure 3 it will be seen that the inner sides 1' of the rotor bars have not been altered but are in their initial state both as regards shape and physical characteristics. The upper portions of the rotor bars have been rendered plastic and they combine, together with the filling bars 3, by the action of the molecular force of adhesion and cohesion. It is to be distinctly understood that the ends of the bars are not fused and flow together as has been previously done but that they are softened throughout a portion only of their extent to permit the forces noted above to act in the manner described and to cause a secured and complete union of the adjacent parts. The heat is highly localized in this process and the physical characteristics of the bars are substantially unaltered thus producing an end ring having a low electrical resistance and having great mechanical strength.

It is to be distinctly noted that no trough nor mold is required as the bar ends are not liquefied and there is no flow of liquid metal to be controlled. Also an extremely simple device may be employed in carrying out this process and further a joint of higher electrical and mechanical efficiency is secured than by methods heretofore practised.

The same method of welding is used in all forms of this invention but a slightly different manner of bringing the rotor bar ends into juxtaposition is illustrated in Figures 4 to 7.

In Figures 4 and 5 the rotor bars 7 are bent downwardly in a radial manner, as indicated at 8, and their ends are then bent outwardly, as indicated at 9. Thereafter, the cooling block is placed inside of the ends 9 in a manner similar to that described in connection with Figures 1 and 2, and welding of the ends 9 is then effected.

In the form shown in Figures 6 and 7, the rotor bars 10 have their extreme ends bent laterally, angularly to the main body portion of the rotor bars. These angularly bent rotor bars 11, as shown clearly in these two figures, may be readily welded by the process explained in detail in connection with Figures 1 and 2.

Figure 8 shows a modified form of cooling block in which a shell 12 is provided with an annular or other shaped aperture 13. Within this aperture water is constantly circulated by any suitable means, as for instance by means of the pipes 14. It is obvious that these pipes may be readily made in the form of hose to permit ready flexing and as the rotor is required to make only one revolution such motion can be easily accommodated by the flexible pipes.

It will be seen that a novel and efficient method of welding rotor bars has been disclosed in which the rotor bars have their inner sides chilled and their outer sides rendered plastic so that they will unite under the action of molecular forces of adhesion and cohesion. It is to be distinctly understood that the ends of the rotor bars are not liquefied and flowed one into the other and molded to form an end ring. This process does not require the use of any mold or auxiliary apparatus of this type as the flowing of the metal is wholly avoided. Not only does this process vastly simplify the welding of rotor bar ends and cheapen the process, but in addition thereto it provides an electrical joint having greater conductivity than the joints heretofore possible due to the fact that the physical characteristics of the rotor bar ends are not materially altered, and the high conductivity of the drawn copper rotor bars is maintained even at this joint.

Obviously, the block may be provided with a flange to contact with ends of rotor bars, or otherwise shaped to secure the desired extent of contact of the block with the bars.

Although the invention has been described in considerable detail, it is to be understood that the invention may be variously embodied and is, therefore, to be limited only as claimed.

We claim:

1. The process of welding the projecting ends of rotor bars comprising simultaneously heating one side of such bars and chilling the other side thereof, whereby flowing of the molten metal is avoided.

2. The process of welding adjacent metal bars comprising placing a chilling member in contact with one side of said bars, forming an electric arc at the other side of said bars, and causing a relative shift to occur between said bars and said arc at a rate to permit said bars to become plastic on one side while the other side remains unchanged.

3. The process of joining the ends of rotor bars comprising substantially closing the space between adjacent ends, placing a cooling member in contact with one side of such ends, forming an arc on the other side of such ends, and causing a relative shift to occur between the arc and said bars laterally of said bars at a speed to permit the successive partial softening of such ends, whereby said ends unite by the action of molecular forces of adhesion and cohesion.

In testimony that we claim the foregoing we have hereunto set our hands at Milwaukee, in the county of Milwaukee and State of Wisconsin.

KLAUS L. HANSEN.
WILLIAM J. OESTERLEIN.